March 3, 1970     E. M. THORNDIKE     3,498,721

NEPHELOMETER

Filed Sept. 7, 1966

INVENTOR.
EDWARD M. THORNDIKE
BY
ATTORNEY

United States Patent Office 3,498,721
Patented Mar. 3, 1970

3,498,721
NEPHELOMETER
Edward M. Thorndike, Montrose, N.Y., assignor, by mesne assignments, to the United States of America as represented by the Secretary of the Navy
Filed Sept. 7, 1966, Ser. No. 577,783
Int. Cl. G01n 15/00, 21/24, 21/25
U.S. Cl. 356—103                    5 Claims

ABSTRACT OF THE DISCLOSURE

A device for measuring the amount of light-scattering that occurs in a fluid is provided in which light from a light source reaches a camera through a series of baffles. An intermediate baffle permits indirect light and attenuated light to reach the camera for comparison.

---

This invention relates to an instrument for measuring the amount of light-scattering which occurs within a fluid medium and, especially, to an instrument for measuring, in situ, the light scattered by matter suspended in seawater.

Measurements of light-scattering by seawater are made to obtain an idea of the amount of suspended material carried by the water at that spot. Such measurements can be useful, for example, in determining the light-transmission properties of the water for photographic applications, in determining the qualities of the water at that location relative to the support of aquatic life, such as, fish, or in sedimentation studies.

Previous methods of obtaining measurements of the amount of light-scattering in seawater have included obtaining samples of the water in containers and measuring the light-scattering properties of the water on a surface vessel or on land, and the measurement of the scattered-light intensity by means of in situ photoelectric devices connected to surface instruments by wires. The advantage of the present invention over the sampling method lies in the fact that samples can become contaminated in handling whereas there is no possibility of contamination of the water with use of the present invention. Also, the in situ method is much less restricted, since there is no need to take samples of the water and to carry the extraneous equipment such as sample bottles.

The objects and advantages of the present invention are accomplished by enclosing within a water-admitting housing a watertight, pressurized light source, a watertight, pressurized camera, and a set of three baffles located between the light source and the camera. The middle baffle contains two centrally located calibration patches which allow direct light to reach the camera and windows, located farther from the center than the two patches, which allow scattered light to reach the camera. A photograph of the light reaching the camera shows four light images, two from the calibration patches and two from the windows; a comparison of the optical densities of the calibration patch images with those of the window images provides a measure of the amount of light scattered by the water.

An object of this invention is to measure the amount of light-scattering which occurs in a fluid.

Another object is to measure, in situ, the amount of light-scattering which occurs at given locations in the sea.

Other objects, advantages and novel features of the invention will become apparent from the following detailed description of the invention when considered in conjunction with the accompanying drawings wherein.

Figure 1:
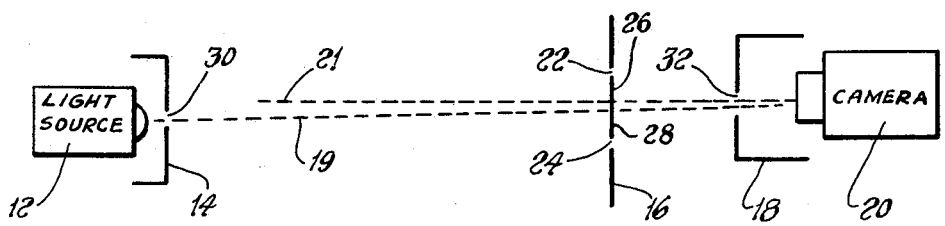
FIG. 1 is a schematic representation of an embodiment of the invention.

The elements of the invention shown in schematic representation in FIG. 1 are mounted within a fluid-admitting housing (not shown) which may merely comprise a metallic frame, for example, to which the other components are affixed. They comprise a light source 12, camera means 20, light-restricting means, such as the light-source baffle 14 mounted near the light source and the camera baffle 18 mounted near the camera means 20, and a calibration baffle 16 mounted between the other two baffles 14 and 18. Line 19 indicates a path of direct light from light source 12 to camera 20 while line 21 represents the center line of the camera projected through the baffles.

The light source 12 and the camera means 20 are mounted in watertight, pressurized housings.

The light-source baffle 14 is opaque to light except for a central aperture 30; it limits the area from which direct light can come toward the camera means 20. Similarly, the camera baffle 18 is opaque except for a central aperture 32; it limits the light passing through it to that which will be imaged on the photographic film by the camera means 20.

Figure 2:
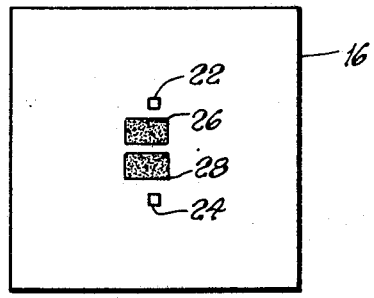
FIG. 2 is a front view of the calibration baffle which can be employed in the invention.

One configuration for the calibration baffle 16 is indicated in front view in FIG. 2. In this embodiment, there are two closely spaced calibration patches 26 and 28 symmetrically disposed about the center line of the baffle 16 and two apertures or windows 22 and 24 located at equal distances from calibration patches 26 and 28, respectively. The windows 22 and 24 permit light scattered by the water to pass through the baffle 16 and to be imaged on the film in the camera means 20. One calibration patch, e.g. 26, attenuates the direct light reaching it so that the light leaving it is slightly stronger than the scattered light; hence, it may be designated the "strong calibration patch." The other calibration patch, e.g. 28, attenuates the direct light so that the light leaving it is slightly weaker than the scattered light; hence, it may be designated the "weak calibration patch."

The size of the windows and patches may typically be one inch square. The calibration patches may be fabricated from such materials as opal glass or translucent plastic, for example.

The invention operates by limiting the light which reaches the camera lens to the direct light through the calibration patches and the scattered light through the windows. The light-source baffle restricts the projected light to a beam whose area just covers an area enclosing the calibration patches so that none of the direct light passes through the windows. The camera baffle limits the light reaching the camera lens to that coming through the windows and patches, barring any other diffused light. The calibration baffle limits all direct light from reaching the camera lens except that passing through the calibration patches.

Basically, only one calibration patch is required for determinations of light-scattering. The intensity of the light coming through the patch, as indicated by the density of its developed image on the camera film measured by a densitometer, for example, is taken as a standard intensity against which the intensity of the scattered light coming through the windows is to be compared. A ratio of the scattered light to the direct light, for example, provides a measure or index of the light-scattering characteristic of the water.

Two windows are provided to give an indication of the symmetry of the configuration. When the intensities of light coming through both windows is the same, the configuration is symmetrical.

Two calibration patches with slightly different strengths are provided to give a direct-light ratio which is useful in the determination of the contrast of the film.

The camera means 20 includes a roll of film and means for moving the film past the lens.

Obviously many modifications and variations of the present invention are possible in the light of the above teachings.

1. Apparatus for determining, in situ, the light-scattering ability of a fluid comprising, in combination:
frame means for immersion in a fluid;
a light source mounted on said frame means in a housing which is impermeable to said fluid;
a single camera means mounted on said frame means in a housing which is impermeable to said fluid for recording photographic images of light from said light source;
light transmission means interposed between said light source and said camera means for passing light both directly and indirectly therebetween, the intensity of light directly passed representing a standard intensity, said light transmission means having at least two spaced openings therein to indirectly pass light from said light source to said camera means; and
camera baffle means interposed between said light transmission means and said camera means to preclude light other than direct and indirect light from said light source from reaching said camera means.

2. The apparatus as defined in claim 1 and further including light baffle means interposed between said light source and said light transmission means for restricting the projected light to a beam which extends only to the periphery of said light transmission means.

3. The apparatus as defined in claim 2 wherein the light transmission means for passing light directly includes at least one calibration patch so that the intensity of the direct light passing therethrough will be indicated by the density of its developed image on the camera film.

4. The apparatus as defined in claim 2 wherein the light transmission means for passing light directly includes at least a pair of like calibration patches so that a symmetrical configuration is provided when like intensities of light pass through the patches.

5. The apparatus as defined in claim 2 wherein the light transmission means for passing light directly includes at least two dissimilar calibration patches to provide a direct-light ratio for film contrast determination.

References Cited

UNITED STATES PATENTS

| | | |
|---|---|---|
| 2,779,233 | 1/1947 | Dodge et al. |
| 2,858,727 | 11/1958 | Stamm et al. |
| 2,873,644 | 2/1959 | Kremen et al. |
| 3,101,232 | 8/1963 | McLarnon et al. _____ 346—107 |
| 3,319,514 | 5/1967 | McAllister. |
| 3,310,680 | 3/1967 | Hasegawa _____ 250—218 |

RONALD L. WIBERT, Primary Examiner

ROBERT J. WEBSTER, Assistant Examiner

U.S. Cl. X.R.

250—218; 356—208